G. H. White.
Feed Trough.
N° 77,689. Patented May 6, 1868.
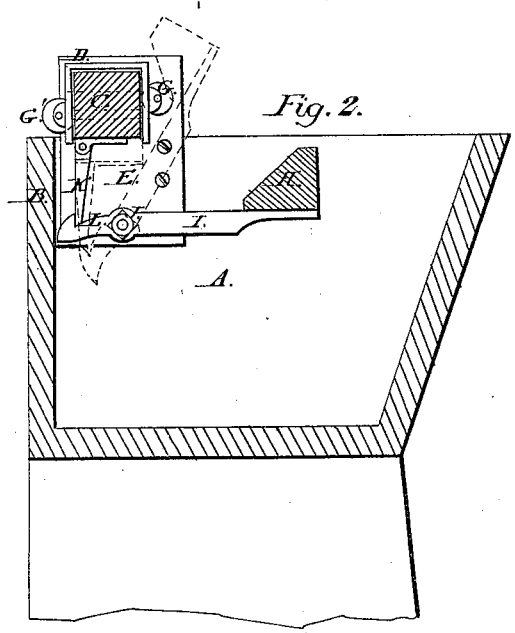
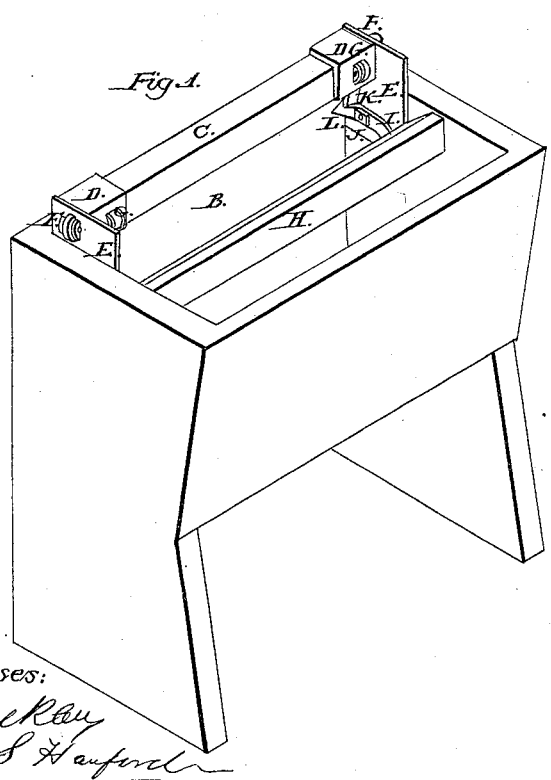
Witnesses:
R. Bockau
George S. Hanford
Inventor:
Geo. H. White

United States Patent Office.

GEORGE H. WHITE, OF HUNTINGTON, NEW YORK.

Letters Patent No. 77,689, dated May 5, 1868.

IMPROVEMENT IN DEVICE FOR PREVENTING AND CURING CRIB-BITING IN HORSES.

*The Schedule referred to in these Letters Patent and making part of the same.*

TO ALL WHOM IT MAY CONCERN:

Be it known that I, GEORGE H. WHITE, of Huntington, in the county of Suffolk, and State of New York, have made a new and useful Device for the Purpose of Preventing and Curing Crib-Bite in Horses; and I do hereby declare that the following is a full, clear, and exact description of the same, reference being had to the accompanying drawings, making part of this specification, in which—

Figure 1 is a perspective view of a manger, with my device attached.

Figure 2 is a vertical cross-section of the same.

Similar letters of reference indicate corresponding parts in the several figures.

Many horses have the habit of biting the crib or manger after eating, and thereby damage the same to a considerable extent. The object of this invention is to provide self-operating means, attached to the crib, manger, or other place, at which the horse may be fastened, for preventing such biting, and curing such habit.

The nature of the invention consists in having the manger, crib, or other place at which the horse may be fastened, furnished with a prominent part upon which the horse will bite, and in having mechanism attached to and connected with said prominent part, which will strike the horse's jaw when he attempts to bite upon said prominent part, causing him to let go his hold, and in course of time curing him of the habit of so biting.

To enable others skilled in the art to make and use my invention, I will proceed to describe its construction and operation.

A, on the drawing annexed, represents an ordinary manger-box, in which the horse's food is placed. Along the side, B, of the same, I arrange a rectangular bar, C, so that it projects above the top edge of the sides of the manger A, thereby leading and causing the horse, when he attempts to bite, to bite upon it, said bar C. Instead of immovably fixing said bar C, I employ a vertical guide-box, D, at each end of the bar, which covers and surrounds such end at all but its lower side, where it is open, and made to allow the bar to slide freely up or down in it. The sides E E, of the guide-boxes D D, which cover the ends of the bar C, are made to project down into the box A, as shown, so as to secure the same, by means of wood-screws or bolts, to the inner sides of the end pieces of the box A; and to provide for the bar C moving freely in said boxes D D, I employ friction-rollers, F F, with their bearings in the sides E E, and friction-rollers G G G' G', to work on the sides of the bar C, of which the rollers G' G' are located lower down than the rollers G G, for the purpose of providing for the easy sliding of the bar C, in case of same being twisted or turned by the horse's bite.

Now, in order to cause the horse to let go his bite on the bar C, and to cure such habit of biting, I employ a secondary bar, H, which counterbalances the bar C, being secured on the arms of two levers, I I, having their fulcra at J J, and the bar C, having vertical pawls, K K, resting in notches, L L, made in the short arms of the said levers I I. The pawls K K being hinged to the bottom side of the bar C, yield to the motion of the levers I I. Now the levers I I are of sufficient length so that the bar H rises above the bar C, whenever the bar C is depressed, as shown by colored lines on fig. 2, and so strikes the horse's jaw as soon as he attempts to bite on the bar C, and depresses it, so causing the horse to let go his hold, and in course of time to abandon the habit of biting.

Instead of using the described device with a manger or crib, it may be so constructed as to be used at a post or other hitching-place of horses.

What I claim as my invention, and desire to secure by Letters Patent, is—

The device herein shown, attached to the manger or any place where the horse may be fastened, and to operate by the motion caused by the biting of the horse, substantially as and for the purpose herein shown.

GEO. H. WHITE.

Witnesses:
R. BACKLER,
GEO. S. HANFORD.